United States Patent
Kim et al.

(10) Patent No.: US 8,245,093 B2
(45) Date of Patent: Aug. 14, 2012

(54) APPARATUS AND METHOD FOR TRANSMITTING AND RECEIVING AUTOMATIC RETRANSMISSION REQUEST FEEDBACK INFORMATION ELEMENT IN A COMMUNICATION SYSTEM

(75) Inventors: Jae-Young Kim, Yongin-si (KR);
Young-Bin Chang, Anyang-si (KR);
Won-Il Lee, Seoul (KR); Sung-Tak Jang, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 988 days.

(21) Appl. No.: 12/242,354

(22) Filed: Sep. 30, 2008

(65) Prior Publication Data
US 2009/0094498 A1    Apr. 9, 2009

(30) Foreign Application Priority Data
Oct. 3, 2007    (KR) .................. 10-2007-0099558

(51) Int. Cl.
*H04L 1/14* (2006.01)
*H04L 1/12* (2006.01)
*G08C 25/02* (2006.01)

(52) U.S. Cl. ........ 714/750; 714/748; 714/749; 714/751; 370/392

(58) Field of Classification Search .................. 714/750
See application file for complete search history.

(56) References Cited

U.S. PATENT DOCUMENTS

| | | | |
|---|---|---|---|
| 5,946,320 A | 8/1999 | Decker | |
| 7,720,070 B1 * | 5/2010 | Li | ................. 370/392 |
| 2005/0163046 A1 | 7/2005 | Koponen et al. | |
| 2005/0208945 A1 * | 9/2005 | Hong et al. | ............... 455/436 |
| 2006/0034277 A1 * | 2/2006 | Jang et al. | ................. 370/389 |
| 2009/0150737 A1 * | 6/2009 | Wang et al. | ............... 714/748 |
| 2010/0008381 A1 * | 1/2010 | Jang et al. | ................. 370/476 |

FOREIGN PATENT DOCUMENTS

| | | |
|---|---|---|
| KR | 10-2007-0048432 A | 5/2007 |
| WO | 2005/064839 A1 | 7/2005 |

* cited by examiner

*Primary Examiner* — M. Mujtaba K Chaudry
*Assistant Examiner* — Justin R Knapp
(74) *Attorney, Agent, or Firm* — Jefferson IP Law, LLP

(57) ABSTRACT

An Automatic Retransmission reQuest (ARQ) data block reception apparatus and method in a communication system is provided. In the ARQ method, an ARQ feedback Information Element (IE) is transmitted to an ARQ data block transmission apparatus. The ARQ feedback IE includes a first field for indicating a Connection IDentifier (CID) of an ARQ connection, a second field for indicating the presence/absence of an additional ARQ feedback IE after the ARQ feedback IE, a third field for indicating a type of an Acknowledgement (ACK) MAP included in the ARQ feedback IE, a fourth field for indicating a Block Sequence Number (BSN) of an ARQ data block, and m ACK MAP fields. The m ACK MAP fields each include information indicating presence/absence of an additional ACK MAP field after a corresponding ACK MAP field, and an ACK MAP indicating success/failure in normal reception for each of n ARQ data blocks, wherein m and n each denote an integer greater than or equal to 1.

30 Claims, 6 Drawing Sheets

| MAP LAST (1 bit) | Sequence Format (1 bit) | Sequence ACK MAP (3 bits) | Sequence 1 Length (4 bits) | Sequence 2 Length (4 bits) | Sequence 3 Length (3 bits) |
|---|---|---|---|---|---|
| MAP LAST (1 bit) | Sequence Format (1 bit) | Sequence ACK MAP (3 bits) | Sequence 1 Length (4 bits) | Sequence 2 Length (4 bits) | Sequence 3 Length (3 bits) |
| ... | | | | | |
| MAP LAST (1 bit) | Sequence Format (1 bit) | Sequence ACK MAP (3 bits) | Sequence 1 Length (4 bits) | Sequence 2 Length (4 bits) | Sequence 3 Length (3 bits) |

FIG.5

APPARATUS AND METHOD FOR TRANSMITTING AND RECEIVING AUTOMATIC RETRANSMISSION REQUEST FEEDBACK INFORMATION ELEMENT IN A COMMUNICATION SYSTEM

PRIORITY

This application claims the benefit under 35 U.S.C. §119 (a) of a Korean patent application filed in the Korean Intellectual Property Office on Oct. 3, 2007 and assigned Serial No. 2007-99558, the entire disclosure of which is hereby incorporated by reference.

BACKGROUND OF THE INVENTION

1. Field of the Invention

The present invention relates to an apparatus and method for improving error control in a communication system. More particularly, the present invention relates to an apparatus and method for transmitting and receiving an Automatic Retransmission reQuest (ARQ) feedback Information Element (IE) in a communication system.

2. Description of the Related Art

The next-generation communication system is being developed to provide various high-speed, high-capacity services to Mobile Stations (MSs). Examples of the next-generation communication system include an Institute of Electrical and Electronics Engineers (IEEE) 802.16 communication system and a Mobile Worldwide Interoperability for Microwave Access (WiMAX) communication system. In a communication system, the efficiency and reliability of transmitting and receiving signals over a channel are important factors when considering the performance of the communication system. However, when transmitting and receiving signals, the communication system may inevitably suffer an error due to noise, interference and/or fading according to the channel condition. Thus, the communication system uses an error control scheme to reduce an information loss caused by such an error. A typical error control scheme can include an ARQ scheme, which is used by the IEEE 802.16 communication system.

A description will now be made of four ARQ feedback Information Element (IE) types used in the IEEE 802.16 communication system.

The first ARQ feedback IE type is a type for indicating success/failure in normal reception of each ARQ data block beginning from an ARQ data block corresponding to an arbitrary Block Sequence Number (BSN), using the arbitrary BSN and each bit of an Acknowledgement (ACK) MAP. For convenience, the first ARQ feedback IE type will be called a 'selective ACK type'.

The second ARQ feedback IE type is a type for indicating only the BSN of an ARQ data block that is first abnormally received or not received, i.e., for which Negative Acknowledgement (NAK) block should first be subject to feedback. Here, the NAK block denotes a block indicating NAK information. For convenience, the second ARQ feedback IE type will be called a 'cumulative ACK type'. The use of the cumulative ACK type indicates success in normal reception of an ARQ data block corresponding to all BSNs preceding the BSN included in an ARQ feedback IE.

The third ARQ feedback IE type is a type for indicating success/failure in normal reception of each ARQ data block, using a BSN of an ARQ data block that is first abnormally received or not received, i.e., for which NAK block should first be subject to feedback, and each bit of an ACK MAP beginning from an ARQ data block corresponding to a BSN, for which NAK block should first be subject to feedback. For convenience, the third ARQ feedback IE type will be called a 'cumulative ACK+ bitmap ACK type'.

The fourth ARQ feedback IE type is a type for indicating the number of consecutive ACK/NAK blocks using a BSN of an ARQ data block that is first abnormally received or not received, i.e., for which NAK block should first be subject to feedback, and a block sequence MAP. For convenience, the fourth ARQ feedback IE type will be called a 'cumulative ACK+ sequence MAP ACK type'.

With reference to FIG. 1, a description will now be made of an ARQ feedback IE format used for transmitting an ARQ feedback IE in an IEEE 802.16 communication system.

FIG. 1 is a diagram illustrating an ARQ feedback IE format for a conventional IEEE 802.16 communication system.

Referring to FIG. 1, the ARQ feedback IE includes a Connection IDentifier (CID) field 111, a LAST field 113, an ACK type field 115, a BSN field 117, a 'Number of ACK MAPs' field 119, and a plurality of, for example, four ACK MAP fields 121, 123, 125 and 127.

The CID field 111 is a field indicating a CID of a corresponding ARQ connection, and the CID field 111 is expressed with 16 bits. The CID can be assigned to each MS individually, or can be individually assigned to each service flow having a different Quality-of-service (QoS) at the same MS. When the CID is individually assigned to each service flow having a different QoS at the same MS, a plurality of CIDs can be assigned to one MS. The LAST field 113 indicates the presence/absence of another ARQ feedback IE after the current ARQ feedback IE, and the LAST field 113 is realized with 1 bit. For example, when the corresponding 1 bit of the LAST field 113 has a value '1', it indicates the absence of another ARQ feedback IE after the current ARQ feedback IE. On the contrary, if the 1 bit of the LAST field 113 has a value '0', it indicates the presence of another ARQ feedback IE after the current ARQ feedback IE. The ACK type field 115 is a field indicating an ARQ feedback IE type, and is expressed with 2 bits. That is, the 2 bits of the ACK type field 115 are used to indicate which of the above described four types of ARQ feedback IE is being used.

In addition, the BSN field 117 indicates a BSN, and is realized with 11 bits. The BSN indicated by the BSN field 117 is determined according to the ARQ feedback IE type. The 'Number of ACK MAPs' field 119 indicates the number of ACK MAPs included in the ARQ feedback IE and is realized with 2 bits. The ACK MAP fields 121, 123, 125 and 127 each indicate an ARQ MAP and are each realized with 16 bits. The ARQ MAP is a bitmap indicating success/failure in normal reception of an ARQ data block including an ARQ data block corresponding to a particular BSN. For example, when a corresponding bit has a value '1', it indicates that the corresponding ARQ data block is normally received. On the contrary, if the corresponding bit has a value '0', it indicates that the corresponding ARQ data block is not normally received, or never received.

The ARQ feedback IE is used by an ARQ data block reception apparatus to comprehensively notify an ARQ data block transmission apparatus of success/failure in normal reception of all received ARQ data blocks. However, as described in FIG. 1, in the IEEE 802.16 communication system, the number of ACK MAPs that may be included in one ARQ feedback IE is limited to four. Therefore, when the amount of ARQ data blocks that the ARQ data block reception apparatus has received is greater than the amount that may be expressed with the limited number of ACK MAPs, it is difficult to comprehensively notify the ARQ data block transmission apparatus of success/failure in normal reception of all ARQ data blocks. Of course, when the selective ACK type is used, since the BSN included in the ARQ feedback IE is an arbitrary BSN, it is possible for the ARQ data block reception apparatus to transmit more than four ACK MAPs by transmitting multiple ARQ feedback IEs. However, it is inefficient that the selective ACK type should indicate success/failure in normal reception for each of all ARQ data blocks, using bits. Therefore, the current IEEE 802.16 communication system tends to use the cumulative ACK type as the ARQ feedback IE type, avoiding use of the selective ACK type. Thus, the current IEEE 802.16 communication system tends to use the ARQ feedback IE type based on the cumulative ACK type, i.e., uses the cumulative ACK type, the cumulative ACK+ bitmap ACK type, and the cumulative ACK+ sequence MAP ACK type.

However, regarding the cumulative ACK type, since the BSN included in an ARQ feedback IE always indicates only the BSN of an ARQ data block, which is first abnormally received or not received, i.e., for which NAK block should first be subject to feedback, it is not possible for the ARQ data block reception apparatus to transmit a plurality of consecutive ARQ feedback IEs for one CID. Since it is not possible for the ARQ data block reception apparatus to transmit a plurality of ARQ feedback IEs, the number of ACK MAPs transmittable by the ARQ data block reception apparatus is always limited to four. When a traffic rate of a single ARQ connection is high and a transmission period of the ARQ feedback IE is long, it is impossible for the ARQ data block reception apparatus to transmit in one ARQ feedback IE the success/failure in normal reception for all received ARQ data blocks due to the above-stated limitation on the number of ACK MAPs. In this case, the traffic rate may be reduced due to the transmission of the ARQ feedback IE. Therefore, even though there are sufficient wireless resources, the ARQ-based process may be delayed, causing a reduction in the entire system performance.

SUMMARY OF THE INVENTION

An aspect of the present invention is to address at least the above-mentioned problems and/or disadvantages and to provide at least the advantages described below. Accordingly, an aspect of the present invention is to provide an apparatus and method for transmitting and receiving an ARQ feedback IE in a communication system.

Another aspect of the present invention is to provide an apparatus and method for transmitting and receiving an ARQ feedback IE without limitation on the number of transmittable ACK MAPs in a communication system.

In accordance with an aspect of the present invention, an Automatic Retransmission reQuest (ARQ) data block reception apparatus in a communication system is provided. The ARQ data block reception apparatus includes an ARQ feedback IE transmission apparatus for transmitting an ARQ feedback Information Element (IE) to an ARQ data block transmission apparatus. The ARQ feedback IE includes a first field for indicating a Connection IDentifier (CID) of an ARQ connection, a second field for indicating presence/absence of an additional ARQ feedback IE after the ARQ feedback IE, a third field for indicating a type of an Acknowledgement (ACK) MAP included in the ARQ feedback IE, a fourth field for indicating a Block Sequence Number (BSN) of an ARQ data block, and m ACK MAP fields. The m ACK MAP fields each include information indicating presence/absence of an additional ACK MAP field after a corresponding ACK MAP field, and an ACK MAP for indicating success/failure in normal reception for each of n ARQ data blocks, wherein m and n each denote an integer greater than or equal to 1.

In accordance with another aspect of the present invention, an Automatic Retransmission reQuest (ARQ) data block transmission apparatus in a communication system is provided. The ARQ data block transmission apparatus includes an ARQ feedback IE reception apparatus for receiving an ARQ feedback Information Element (IE) from an ARQ data block reception apparatus. The ARQ feedback IE includes a first field for indicating a Connection IDentifier (CID) of an ARQ connection, a second field for indicating presence/absence of an additional ARQ feedback IE after the ARQ feedback IE, a third field for indicating a type of an Acknowledgement (ACK) MAP included in the ARQ feedback IE, a fourth field for indicating a Block Sequence Number (BSN) of an ARQ data block, and m ACK MAP fields. The m ACK MAP fields each include information indicating presence/absence of an additional ACK MAP field after a corresponding ACK MAP field, and an ACK MAP for indicating success/failure in normal reception for each of n ARQ data blocks, and wherein m and n each denote an integer greater than or equal to 1.

In accordance with a further aspect of the present invention, a method for transmitting an Automatic Retransmission reQuest (ARQ) feedback Information Element (IE) by an ARQ data block reception apparatus in a communication system is provided. The method includes transmitting an ARQ feedback IE to an ARQ data block transmission apparatus. The ARQ feedback IE includes a first field for indicating a Connection IDentifier (CID) of an ARQ connection, a second field for indicating presence/absence of an additional ARQ feedback IE after the ARQ feedback IE, a third field for indicating a type of an Acknowledgement (ACK) MAP included in the ARQ feedback IE, a fourth field for indicating a Block Sequence Number (BSN) of an ARQ data block, and m ACK MAP fields. The m ACK MAP fields each include information indicating presence/absence of an additional ACK MAP field after a corresponding ACK MAP field, and an ACK MAP for indicating success/failure in normal reception for each of n ARQ data blocks, and wherein m and n each denote an integer greater than or equal to 1.

In accordance with yet another aspect of the present invention, a method for receiving an Automatic Retransmission reQuest (ARQ) feedback Information Element (IE) by an ARQ data block transmission apparatus in a communication system is provided. The method includes receiving an ARQ feedback IE from an ARQ data block reception apparatus. The ARQ feedback IE includes a first field for indicating a Connection IDentifier (CID) of an ARQ connection, a second field for indicating presence/absence of an additional ARQ feedback IE after the ARQ feedback IE, a third field for indicating a type of an Acknowledgement (ACK) MAP included in the ARQ feedback IE, a fourth field for indicating a Block Sequence Number (BSN) of an ARQ data block, and m ACK MAP fields. The m ACK MAP fields each include information for indicating presence/absence of an additional ACK MAP field after a corresponding ACK MAP field, and an ACK MAP for success/failure in normal reception for each of n ARQ data blocks, and wherein m and n each denote an integer greater than or equal to 1.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following description taken in conjunction with the accompanying drawings in which:

FIG. 5 is a diagram illustrating an exemplary format of the ACK MAP fields 221-1, 221-2, . . . , 221-n of FIG. 2 when the ACK MAP type used in the IEEE 802.16 communication system is the 3-block sequence MAP type;

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides an apparatus and method for transmitting and receiving an Automatic Retransmission reQuest (ARQ) feedback Information Element (IE) in a communication system. Although a description of the present invention will be given herein with reference to an Institute of Electrical and Electronics Engineers (IEEE) 802.16 communication system as an example of the communication system, the ARQ feedback IE transmission/reception apparatus and method proposed by the present invention can be used not only in the IEEE 802.16 communication system but also in other communication systems such as a Mobile Worldwide Interoperability for Microwave Access (WiMAX) communication system.

Figure 1:
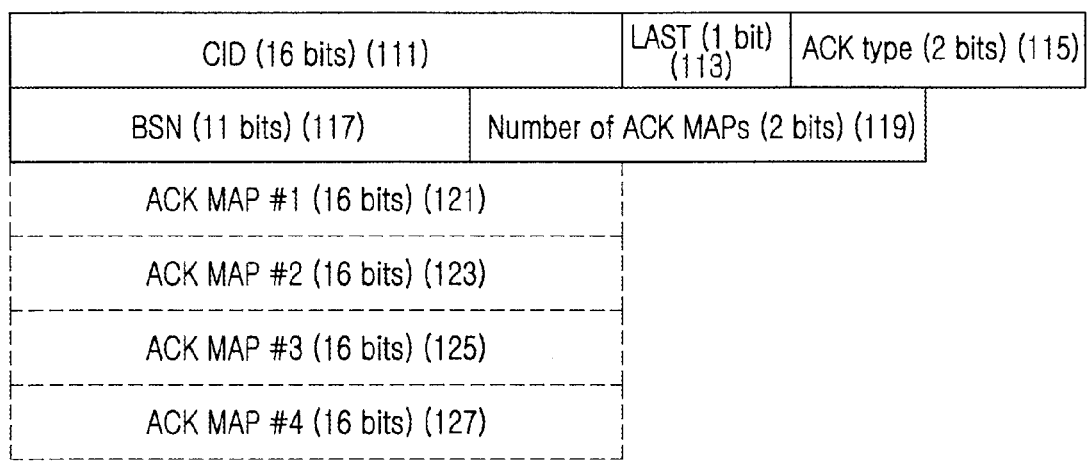
FIG. 1 is a diagram illustrating an ARQ feedback IE format for a conventional IEEE 802.16 communication system.
Figure 2:
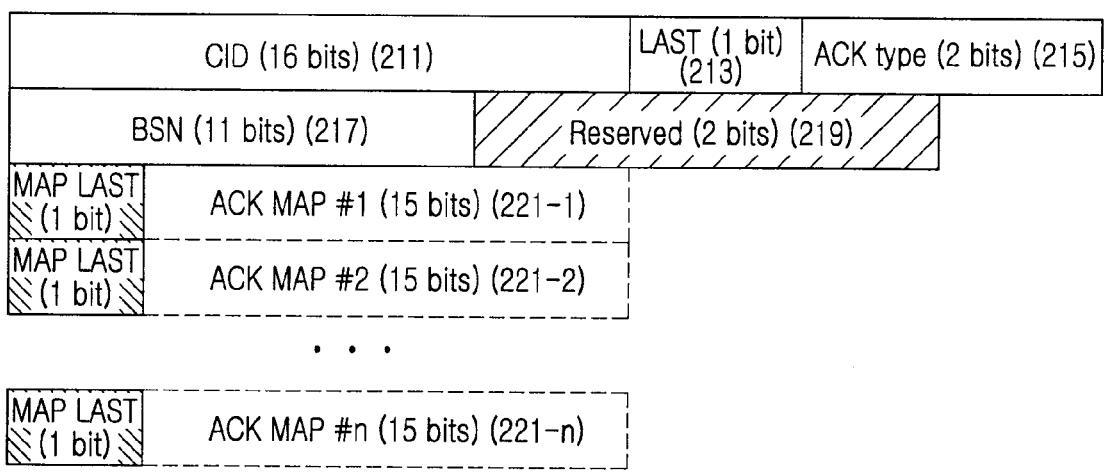
FIG. 2 is a diagram illustrating an ARQ feedback IE format used in an IEEE 802.16 communication system according to an exemplary embodiment of the present invention.

It will be assumed herein that an ARQ data block reception apparatus transmits an ARQ feedback IE to an ARQ data block transmission apparatus according to a preset period. With reference to FIG. 2, a description will now be made of an ARQ feedback IE format used in an IEEE 802.16 communication system according to an exemplary embodiment of the present invention. The term 'ARQ feedback IE' refers to an IE that is used for transmitting an ARQ feedback in the IEEE 802.16 communication system.

FIG. 2 is a diagram illustrating an ARQ feedback IE format used in an IEEE 802.16 communication system according to an exemplary embodiment of the present invention.

Referring to FIG. 2, the ARQ feedback IE includes a Connection IDentifier (CID) field 211, a LAST field 213, an Acknowledgement (ACK) type field 215, a Block Sequence Number (BSN) field 217, a Reserved field 219, and a plurality of, for example, n ACK MAP fields 221-1, 221-2, . . . , 221-n.

The CID field 211 is a field for indicating a CID of a corresponding Mobile Station (MS), and the CID field 211 is expressed with, for example, 16 bits. The CID can be assigned to each MS individually, or can be individually assigned to each service flow having different Quality-of-Services (QoSs) at the same MS. When the CID is individually assigned to each service flow having different QoSs at the same MS, a plurality of CIDs can be assigned to one MS. The LAST field 213 indicates the presence/absence of another ARQ feedback IE after the current ARQ feedback IE and is realized with 1 bit. For example, when a corresponding 1 bit of the LAST field 213 has a value '1', it indicates the absence of another ARQ feedback IE after the current ARQ feedback IE. On the contrary, if the 1 bit has a value '0', it indicates the presence of another ARQ feedback IE after the current ARQ feedback IE. The ACK type field 215 is a field for indicating a type of ACK MAPs included in the ARQ feedback IE, and is expressed with, for example, 2 bits. When a value of the ACK type field 215 is '0x2', it indicates that the ACK MAP type is a bitmap type, and when a value of the ACK type field 215 is '0x3', it indicates that the ACK MAP type is a sequence MAP type. A detailed description of the ACK MAP type will be given below.

The BSN field 217 indicates a BSN and is realized with, for example, 11 bits. The BSN indicated by the BSN field 217 can be, for example, a BSN of an ARQ data block that is a first ARQ data block abnormally received or not received, among all ARQ data blocks that the ARQ data block reception apparatus has received, i.e., a first ARQ data block for which Negative Acknowledgement (NAK) block is appropriate feedback. Here, the NAK block denotes a block indicating NAK information. The BSN indicated by the BSN field 217 can also be an arbitrary BSN. The Reserved field 219 is a field reserved for writing additional information therein, and this field is realized with, for example, 2 bits.

The ACK MAP fields 221-1, 221-2, . . . , 221-n each indicate an ARQ MAP, and can be realized with, for example, 16 bits. For example, the first bit in the 16-bit ARQ MAP indicates the presence/absence of an additional ARQ MAP after the corresponding ARQ MAP. For convenience, the first bit of an ARQ MAP, which indicates the presence/absence of an additional ARQ MAP after the corresponding ARQ MAP, will be called a 'MAP LAST' bit. For example, when the value of the MAP LAST bit is '0', it indicates the presence of an additional ARQ MAP after the corresponding ARQ MAP. Alternatively, when a value of the MAP LAST bit is '1', it indicates the absence of an additional ARQ MAP after the corresponding ARQ MAP, i.e., indicates that the corresponding ARQ MAP is the last ARQ MAP included in the ARQ feedback IE.

Figure 3:
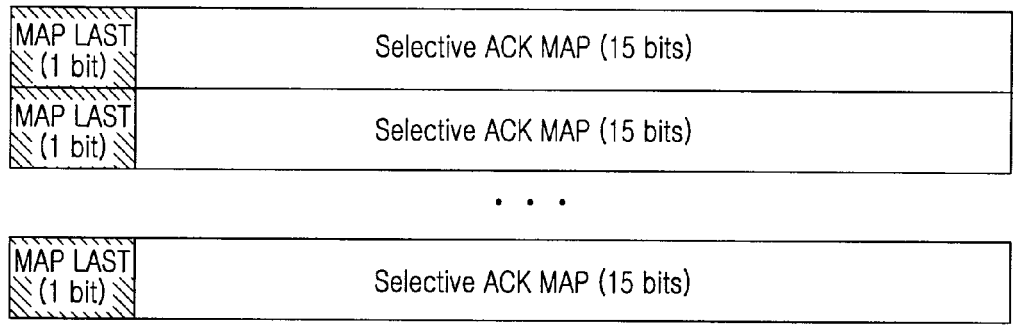
FIG. 3 is a diagram illustrating an exemplary format of the ACK MAP fields 221-1, 221-2, . . . , 221-n of FIG. 2 when the ACK MAP type used in the IEEE 802.16 communication system is the bitmap type.

The remaining 15 bits in the 16-bit ARQ MAP indicate success/failure in normal reception for succeeding ARQ data blocks including the ARQ data block corresponding to the BSN indicated by the BSN field 217. In the IEEE 802.16 communication system, the ACK MAP is generated as either a bitmap type or a sequence MAP type. With reference to FIG. 3, a description will be made of a format of the ACK MAP fields 221-1, 221-2, ..., 221-*n* when the ACK MAP type is the bitmap type, and with reference to FIGS. 4 and 5 when the ACK MAP type is the sequence MAP type.

FIG. 3 is a diagram illustrating an exemplary format of the ACK MAP fields 221-1, 221-2, ..., 221-*n* of FIG. 2 when the ACK MAP type used in the IEEE 802.16 communication system is the bitmap type.

Referring to FIG. 3, since the ACK MAP type used in the IEEE 802.16 communication system is the bitmap type, the ACK MAP included in each of the ACK MAP fields 221-1, 221-2, ..., 221-*n* is realized as a bitmap. For convenience, the ACK MAP realized as a bitmap will be called a 'selective ACK MAP'. As described in FIG. 2, since the first bit in each ACK MAP is the MAP LAST bit, the remaining 15 bits indicate success/failure in normal reception for the corresponding ARQ data block. For example, when the corresponding bit of the 15 bits has a value '1', it indicates that the corresponding ARQ data block has been normally received. On the contrary, when the corresponding bit has a value '0', it indicates that the corresponding ARQ data block has not been normally received or has never been received. Of course, as shown in FIG. 2, the first ACK MAP field 221-1 after the BSN field 217 indicates success/failure in normal reception for succeeding ARQ data blocks including the ARQ data block corresponding to the BSN indicated by the BSN field 217, and the ACK MAP field 221-2 indicates success/failure in normal reception for 15 ARQ data blocks after the ARQ data block indicated by a bitmap of 15 bits except for the first bit of the ACK MAP field 221-1. In this manner, it is possible to indicate success/failure in normal reception for the 15 ARQ data blocks up to the last ACK MAP field 221-*n*.

The sequence MAP used in the IEEE 802.16 communication system is further sub-classified into a 2-block sequence MAP type and a 3-block sequence MAP type. The 2-block sequence MAP type indicates that one ACK MAP is generated from 2 consecutive ACK/NAK blocks, and the 3-block sequence MAP type indicates that one ACK MAP is generated from 3 consecutive ACK/NAK blocks. Here, the consecutive ACK denotes consecutive ACK blocks, and an ACK block denotes a block indicating ACK information. And, the consecutive NAK denotes consecutive NAK blocks. Since the 2-block sequence MAP type and the 3-block sequence MAP type have are not relevant to the present invention, a detailed description thereof will be omitted herein.

Figure 4:
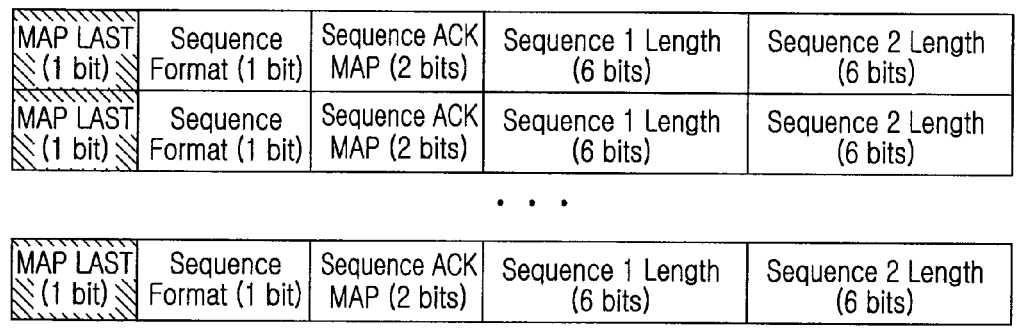
FIG. 4 is a diagram illustrating an exemplary format of the ACK MAP fields 221-1, 221-2, . . . , 221-n of FIG. 2 when the ACK MAP type used in the IEEE 802.16 communication system is the 2-block sequence MAP type.

With reference to FIGS. 4 and 5, descriptions will now be made of exemplary formats of the ACK MAP fields 221-1, 221-2, ..., 221-*n* when the ACK MAP type used in the IEEE 802.16 communication system is the 2-block sequence MAP type and the 3-block sequence MAP type, respectively.

FIG. 4 is a diagram illustrating an exemplary format of the ACK MAP fields 221-1, 221-2, ..., 221-*n* of FIG. 2 when the ACK MAP type used in the IEEE 802.16 communication system is the 2-block sequence MAP type.

Referring to FIG. 4, since the ACK MAP type used in the IEEE 802.16 communication system is the 2-block sequence MAP type, the ACK MAP included in each of the ACK MAP fields 221-1, 221-2, ..., 221-*n* is realized with the 2-block sequence MAP type. As described above with reference to FIG. 2, since the first bit in each ACK MAP is the MAP LAST bit, the remaining 15 bits indicate the success/failure in normal reception for the corresponding ARQ data block. For convenience, the ACK MAP realized in the 2-block sequence MAP type will be called a '2-block sequence MAP'.

The 2-block sequence MAP includes a MAP LAST field, a Sequence Format field, a Sequence ACK MAP field, a Sequence 1 Length field (or a first sequence length field), and a Sequence 2 Length field (or second sequence length field). The Sequence Format field, realized with 1 bit, indicates whether the corresponding ACK MAP is a 2-block sequence MAP or a 3-block sequence MAP. For example, when the 1-bit value of the Sequence Format field is '0', it indicates that the corresponding ACK MAP is a 2-block sequence MAP. Otherwise, when the 1-bit value of the Sequence Format field is '1', it indicates that the corresponding ACK MAP is a 3-block sequence MAP.

The Sequence ACK MAP field is realized with, for example, 2 bits. Of the 2 bits in the Sequence ACK MAP field, the first bit indicates whether a sequence MAP included in the Sequence 1 Length field is a consecutive ACK or a consecutive NAK, and the second bit indicates whether sequence MAP included in the Sequence 2 Length field is a consecutive ACK or a consecutive NAK. When a value of either of the 2 bits is '1', it indicates that a sequence MAP included in the corresponding length field is a consecutive ACK. In contrast, when the bit value is '0', it indicates that a sequence MAP included in the corresponding length field is a consecutive NAK. For example, if the 2 bits of the Sequence ACK MAP field are '01', the Sequence 1 Length field indicates a consecutive NAK, and the Sequence 2 Length field indicates a consecutive ACK.

A description of exemplary embodiments of the present invention has been made so far on the assumption that the Sequence ACK MAP field is realized with 2 bits. However, in the case where the IEEE 802.16 communication system determines the BSN included in the BSN field 217 as a BSN of an ARQ data block for which NAK should be transmitted first, since the ARQ data block corresponding to the BSN included in the BSN field 217 is an ARQ data block for which NAK should always be transmitted, it is possible to realize, using only 1 bit, a Sequence ACK MAP field of the first ACK MAP field in the ARQ feedback IE. When the Sequence ACK MAP field is realized with 1 bit, the 1 bit indicates whether the Sequence 2 Length field is a consecutive ACK or a consecutive NAK.

The Sequence 1 Length field and the Sequence 2 Length field are each realized with, for example, 6 bits, and these fields indicate the number of consecutive ACK/NAK blocks.

FIG. 5 is a diagram illustrating an exemplary format of the ACK MAP fields 221-1, 221-2, ..., 221-*n* of FIG. 2 when the ACK MAP type used in the IEEE 802.16 communication system is the 3-block sequence MAP type.

Referring to FIG. 5, since the ACK MAP type used in the IEEE 802.16 communication system is the 3-block sequence MAP type, the ACK MAP included in each of the ACK MAP fields 221-1, 221-2, ..., 221-*n* is realized in the 3-block sequence MAP type. As described above with reference to FIG. 2, since the first bit in each ACK MAP is the MAP LAST bit, the remaining 15 bits indicate the success/failure in normal reception for the corresponding ARQ data block. For convenience, the ACK MAP realized in the 3-block sequence MAP type will be called a '3-block sequence MAP'.

The 3-block sequence MAP includes a MAP LAST field, a Sequence Format field, a Sequence ACK MAP field, a Sequence 1 Length field, a Sequence 2 Length field, and a Sequence 3 Length field. The Sequence Format field, realized with 1 bit, indicates whether the corresponding ACK MAP is a 2-block sequence MAP or a 3-block sequence MAP. The Sequence ACK MAP field is realized with, for example, 3 bits. Of the 3 bits in the Sequence ACK MAP field, the first bit indicates whether the sequence MAP included in the Sequence 1 Length field is a consecutive ACK or a consecutive NAK, the second bit indicates whether the sequence MAP included in the Sequence 2 Length field is a consecutive ACK or a consecutive NAK, and the third bit indicates whether the sequence MAP included in the Sequence 3 Length field is a consecutive ACK or a consecutive NAK. When a value of any of the 3 bits is '1', it indicates that the sequence MAP included in the corresponding length field is a consecutive ACK. Otherwise, when the value is '0', it indicates that the sequence MAP included in the corresponding length field is a consecutive NAK. For example, if 3 bits of the Sequence ACK MAP field are '010', the Sequence 1 Length field indicates a consecutive NAK, the Sequence 2 Length field indicates a consecutive ACK, and the Sequence 3 Length field indicates a consecutive NAK.

A description of exemplary embodiments of the present invention has been made so far on assumption that the Sequence ACK MAP field is realized with 3 bits. However, in the case where the IEEE 802.16 communication system determines the BSN included in the BSN field 217 as a BSN of an ARQ data block for which NAK should be transmitted first, since the ARQ data block corresponding to the BSN included in the BSN field 217 is an ARQ data block for which NAK should always be transmitted, it is possible to realize, with 2 bits, a Sequence ACK MAP field of the first ACK MAP field in the ARQ feedback IE. When the Sequence ACK MAP field is realized with 2 bits, the first bit of the 2 bits indicates whether the Sequence 2 Length field is a consecutive ACK or a consecutive NAK, and the second bit indicates whether the Sequence 3 Length field is a consecutive ACK or a consecutive NAK.

Figure 6:
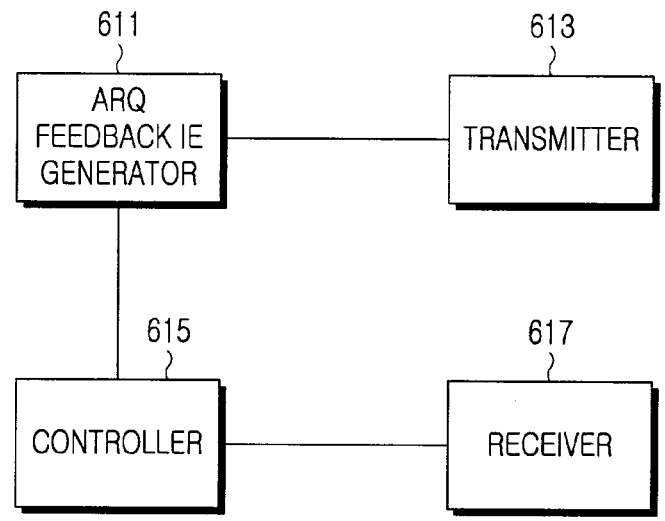
FIG. 6 is a diagram illustrating a structure of an ARQ data block reception apparatus for an IEEE 802.16 communication system according to an exemplary embodiment of the present invention.

With reference to FIG. 6, a description will now be made of a structure of an ARQ data block reception apparatus in an IEEE 802.16 communication system according to an exemplary embodiment of the present invention. Herein, the ARQ data block reception apparatus serves as an ARQ feedback IE transmission apparatus.

FIG. 6 is a diagram illustrating a structure of an ARQ data block reception apparatus for an IEEE 802.16 communication system according to an exemplary embodiment of the present invention.

Referring to FIG. 6, the ARQ data block reception apparatus includes an ARQ feedback IE generator 611, a transmitter 613, a controller 615, and a receiver 617.

The receiver 617 performs reception processing on the ARQ data blocks transmitted by an ARQ data block transmission apparatus. Since the reception processing operation of the receiver 617 is not especially relevant to the present invention, a detailed description thereof will be omitted herein for conciseness. The controller 615 determines the success/failure in normal reception for the corresponding ARQ data block depending on the reception processing results of the ARQ data blocks by the receiver 617. The controller 615 controls an ARQ feedback IE generation operation of the ARQ feedback IE generator 611. Since the ARQ feedback IE generated by the ARQ feedback IE generator 611 has been described above, its description will not be repeated here. The ARQ feedback IE generator 611 outputs the generated ARQ feedback IE to the transmitter 613, and the transmitter 613 performs transmission processing on the ARQ feedback IE, transmitting it to the ARQ data block transmission apparatus. Since the transmission processing operation of the transmitter 613 is not especially relevant to the present invention, a detailed description thereof will be omitted herein.

Figure 7:
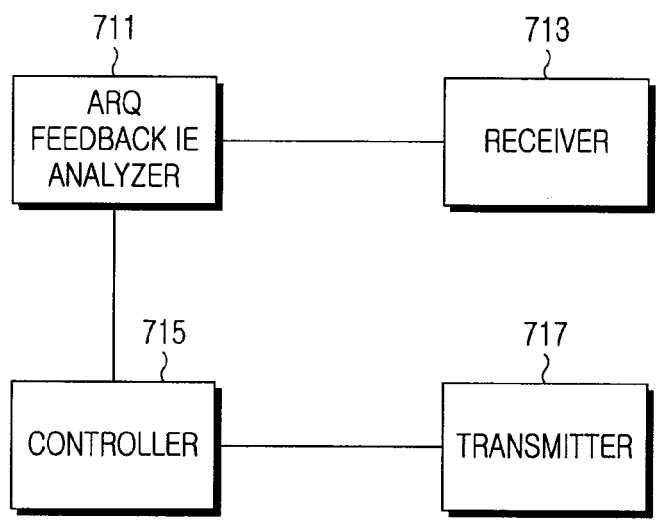
FIG. 7 is a diagram illustrating a structure of an ARQ data block transmission apparatus for an IEEE 802.16 communication system according to an embodiment of the present invention.

With reference to FIG. 7, a description will now be made of a structure of an ARQ data block transmission apparatus for an IEEE 802.16 communication system according to an exemplary embodiment of the present invention. Herein, the ARQ data block transmission apparatus serves as an ARQ feedback IE reception apparatus.

FIG. 7 is a diagram illustrating a structure of an ARQ data block transmission apparatus for an IEEE 802.16 communication system according to an exemplary embodiment of the present invention.

Referring to FIG. 7, the ARQ data block transmission apparatus includes an ARQ feedback IE analyzer 711, a receiver 713, a controller 715, and a transmitter 717.

The transmitter 717 performs transmission processing on ARQ data blocks, and transmits them to an ARQ data block reception apparatus. Since the transmission processing operation of the transmitter 717 is not especially relevant to the present invention, a detailed description thereof will be omitted herein. The receiver 713 performs reception processing on the ARQ feedback IE received from the ARQ data block reception apparatus according to the ARQ data block transmission, and outputs the reception-processed ARQ feedback IE to the ARQ feedback IE analyzer 711. Since the reception processing operation of the receiver 713 is not especially relevant to the present invention, a detailed description thereof will be omitted herein. The ARQ feedback IE analyzer 711 analyzes the ARQ feedback IE under the control of the controller 715. The ARQ feedback IE analyzed by the ARQ feedback IE analyzer 711 has been described above and its description will not be repeated here.

Figure 8:
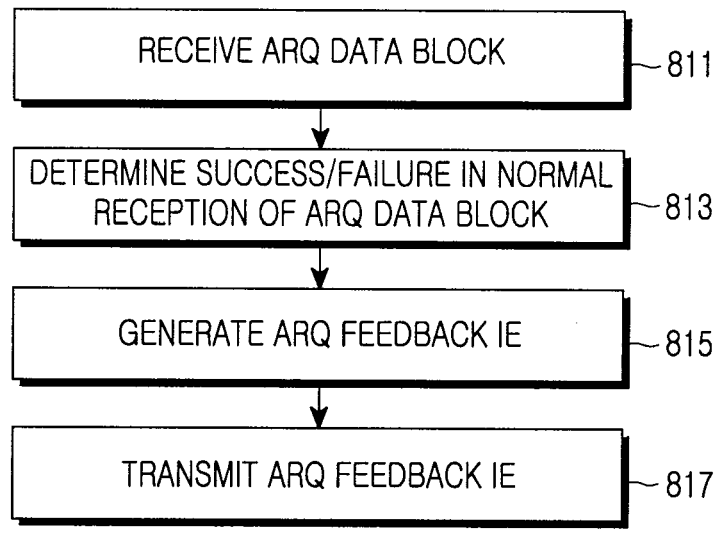
FIG. 8 is a flowchart illustrating an operation of an ARQ data block reception apparatus in an IEEE 802.16 communication system according to an exemplary embodiment of the present invention.

With reference to FIG. 8, a description will now be made of an operation of an ARQ data block reception apparatus in an IEEE 802.16 communication system according to an exemplary embodiment of the present invention.

FIG. 8 is a flowchart illustrating an operation of an ARQ data block reception apparatus in an IEEE 802.16 communication system according to an exemplary embodiment of the present invention.

Referring to FIG. 8, in step 811, the ARQ data block reception apparatus receives an ARQ data block from an ARQ data block transmission apparatus. In step 813, the ARQ data block reception apparatus determines the success/failure in normal reception for the received ARQ data block. In step 815, the ARQ data block reception apparatus generates an ARQ feedback IE according to the determined success/failure in normal reception of the ARQ data block. The ARQ feedback IE generation operation has been described above and its description will not be repeated here for conciseness. Thereafter, in step 817, the ARQ data block reception apparatus transmits the generated ARQ feedback IE to the ARQ data block transmission apparatus.

Figure 9:
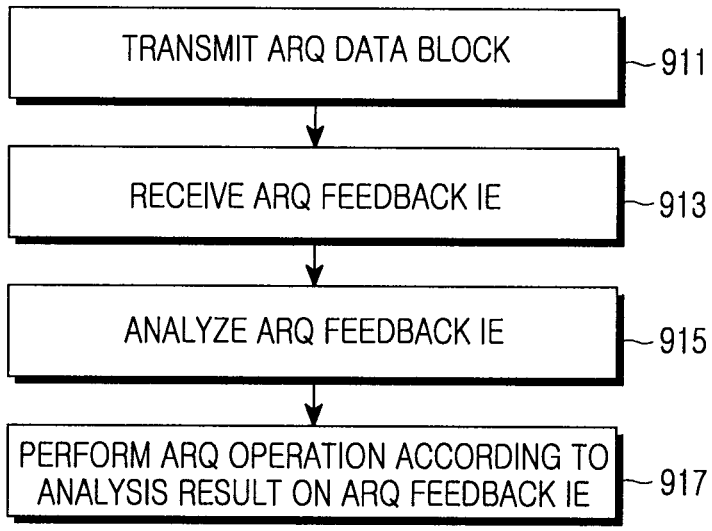
FIG. 9 is a flowchart illustrating an operation of an ARQ data block transmission apparatus in an IEEE 802.16 communication system according to an exemplary embodiment of the present invention.

With reference to FIG. 9, a description will now be made of an operation of an ARQ data block transmission apparatus in an IEEE 802.16 communication system according to an exemplary embodiment of the present invention.

FIG. 9 is a flowchart illustrating an operation of an ARQ data block transmission apparatus in an IEEE 802.16 communication system according to an exemplary embodiment of the present invention.

Referring to FIG. 9, in step 911, the ARQ data block transmission apparatus transmits an ARQ data block to an ARQ data block reception apparatus. In step 913, the ARQ data block transmission apparatus receives an ARQ feedback IE for the transmitted ARQ data block, from the ARQ data block reception apparatus. In step 915, the ARQ data block transmission apparatus analyzes the received ARQ feedback IE. The ARQ feedback IE analyzing operation has been described above and its description will not be repeated here for conciseness. Thereafter, in step 917, the ARQ data block transmission apparatus performs an ARQ operation according to the ARQ feedback IE analyzing results.

As is apparent from the foregoing description, according to exemplary embodiments of the present invention, the communication system can transmit and receive an ARQ feedback IE without limitation on the number of transmittable ACK MAPs, thereby preventing the possible process delay caused by the use of the ARQ scheme and thus improving the entire system performance.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting an Automatic Retransmission reQuest (ARQ) feedback Information Element (IE) by an ARQ data block reception apparatus in a communication system, the method comprising:

generating an ARQ feedback IE including a first field for indicating a Connection IDentifier (CID) of an ARQ connection, a second field for indicating presence/absence of an additional ARQ feedback IE after the ARQ feedback IE, a third field for indicating a type of an Acknowledgement (ACK) MAP included in the ARQ feedback IE, a fourth field for indicating a Block Sequence Number (BSN) of an ARQ data block, and m ACK MAP fields; and transmitting the ARQ feedback IE to an ARQ data block transmission apparatus, wherein the m ACK MAP fields each include information indicating presence/absence of an additional ACK MAP field after a corresponding ACK MAP field, and an ACK MAP indicating success/failure in normal reception for each of n ARQ data blocks, and wherein m and n each denote an integer greater than or equal to 1.

2. The method of claim 1, wherein n ARQ data blocks, success/failure in normal reception of which is indicated by a first ACK MAP that is an ACK MAP included in a first ACK MAP field among the m ACK MAP fields, include a first ARQ data block that is an ARQ data block mapped to the BSN and (n−1) ARQ data blocks after the first ARQ data block, and an ACK MAP, included in each of (m−1) ACK MAP fields except for the first ACK MAP field among the m ACK MAP fields, includes a second ARQ data block that is an ARQ data block after n ARQ data blocks, success/failure in normal reception of which is indicated by an ACK MAP included in an ACK MAP field before a corresponding ACK MAP field, and (n−1) ARQ data blocks after the second ARQ data block.

3. The method of claim 2, wherein the type of the ACK MAP comprises one of a bitmap type and a sequence MAP type.

4. The method of claim 3, wherein, when the ACK MAP type comprises the bitmap type, an ACK MAP included in each of the m ACK MAP fields is generated in the form of a bitmap, and each of m ACK MAPs generated in the form of the bitmap includes the information and a selective ACK MAP field for indicating the ACK MAP.

5. The method of claim 3, wherein, when the ACK MAP type comprises the sequence MAP type, an ACK MAP included in each of the m ACK MAP fields is generated in the form of a sequence MAP, and each of m ACK MAPs generated in the form of the sequence MAP includes the information, a sequence format field for indicating a sequence format of the sequence MAP, p sequence length fields, and a sequence ACK MAP field for indicating that a sequence MAP included in each of the p sequence length fields is one of consecutive ACK and consecutive Negative Acknowledgement (NAK), wherein p denotes an integer greater than or equal to 2.

6. The method of claim 5, wherein the sequence format comprises one of a first format indicating that the p sequence length fields comprise 2 sequence length fields, and a second format indicating that the p sequence length fields comprise 3 sequence length fields, and wherein, when the sequence format comprises the first format, the sequence format field is realized with 2 bits, 1 bit of the 2 bits indicates that a sequence MAP included in one sequence length field of the 2 sequence length fields is generated to indicate one of consecutive ACK and consecutive NAK, and the remaining 1 bit of the 2 bits indicates that a sequence MAP included in the remaining sequence length field of the 2 sequence length fields is generated to indicate one of consecutive ACK and consecutive NAK.

7. The method of claim 5, wherein the sequence format comprises one of a first format indicating that the p sequence length fields comprise 2 sequence length fields, and a second format indicating that the p sequence length fields comprise 3 sequence length fields, and wherein, when the sequence format comprises the second format, the sequence format field is realized with 3 bits, 1 bit of the 3 bits indicates that a sequence MAP included in 1 sequence length field of the 3 sequence length fields is generated to indicate one of consecutive ACK and consecutive NAK, 1 bit of the remaining 2 bits indicates that a sequence MAP included in 1 sequence length field of the remaining 2 sequence length fields is generated to indicate one of consecutive ACK and consecutive NAK, and the remaining 1 bit of the 3 bits indicates that a sequence MAP included in the remaining 1 sequence length field of the 3 sequence length fields is generated to indicate one of consecutive ACK and consecutive NAK.

8. A method for receiving an Automatic Retransmission reQuest (ARQ) feedback Information Element (IE) by an ARQ data block transmission apparatus in a communication system, the method comprising:

receiving, from an ARQ data block reception apparatus, an ARQ feedback IE including a first field for indicating a Connection IDentifier (CID) of an ARQ connection, a second field for indicating presence/absence of an additional ARQ feedback IE after the ARQ feedback IE, a third field for indicating a type of an Acknowledgement (ACK) MAP included in the ARQ feedback IE, a fourth field for indicating a Block Sequence Number (BSN) of an ARQ data block, and m ACK MAP fields; and receiving an ARQ feedback based on the ARQ feedback IE, wherein the m ACK MAP fields each include information indicating presence/absence of an additional ACK MAP field after a corresponding ACK MAP field, and an ACK MAP indicating success/failure in normal reception for each of n ARQ data blocks, and wherein m and n each denote an integer greater than or equal to 1.

9. The method of claim 8, wherein n ARQ data blocks, success/failure in normal reception of which is indicated by a first ACK MAP that is an ACK MAP included in a first ACK MAP field among the m ACK MAP fields, include a first ARQ data block that is an ARQ data block mapped to the BSN and (n−1) ARQ data blocks after the first ARQ data block, and an ACK MAP, included in each of (m−1) ACK MAP fields except for the first ACK MAP field among the m ACK MAP fields, includes a second ARQ data block that is an ARQ data block after n ARQ data blocks, success/failure in normal reception of which is indicated by an ACK MAP included in an ACK MAP field before a corresponding ACK MAP field, and (n−1) ARQ data blocks after the second ARQ data block.

10. The method of claim 9, wherein the type of the ACK MAP comprises one of a bitmap type and a sequence MAP type.

11. The method of claim 10, wherein when the ACK MAP type comprises the bitmap type, an ACK MAP included in each of the m ACK MAP fields is generated in the form of a bitmap, and each of m ACK MAPs generated in the form of the bitmap includes the information and a selective ACK MAP field for indicating the ACK MAP.

12. The method of claim 10, wherein when the ACK MAP type comprises the sequence MAP type, an ACK MAP included in each of the m ACK MAP fields is generated in the form of a sequence MAP, and each of m ACK MAPs generated in the form of the sequence MAP includes the information, a sequence format field for indicating a sequence format of the sequence MAP, p sequence length fields, and a sequence ACK MAP field for indicating that a sequence MAP included in each of the p sequence length fields is one of consecutive ACK and consecutive Negative Acknowledgement (NAK), wherein p denotes an integer greater than or equal to 2.

13. The method of claim 12, wherein the sequence format comprises one of a first format indicating that the p sequence length fields comprise 2 sequence length fields, and a second format indicating that the p sequence length fields comprise 3 sequence length fields, and wherein, when the sequence format comprises the first format, the sequence format field is realized with 2 bits, 1 bit of the 2 bits indicates that a sequence MAP included in one sequence length field of the 2 sequence length fields is generated to indicate one of consecutive ACK and consecutive NAK, and the remaining 1 bit of the 2 bits indicates that a sequence MAP included in the remaining sequence length field of the 2 sequence length fields is generated to indicate one of consecutive ACK and consecutive NAK.

14. The method of claim 12, wherein the sequence format comprises one of a first format indicating that the p sequence length fields comprise 2 sequence length fields, and a second format indicating that the p sequence length fields comprise 3 sequence length fields, and wherein, when the sequence format comprises the second format, the sequence format field is realized with 3 bits, 1 bit of the 3 bits indicates that a sequence MAP included in 1 sequence length field of the 3 sequence length fields is generated to indicate one of consecutive ACK and consecutive NAK, 1 bit of the remaining 2 bits indicates that a sequence MAP included in 1 sequence length field of the remaining 2 sequence length fields is generated to indicate one of consecutive ACK and consecutive NAK, and the remaining 1 bit of the 3 bits indicates that a sequence MAP included in the remaining 1 sequence length field of the 3 sequence length fields is generated to indicate one of consecutive ACK and consecutive NAK.

15. An Automatic Retransmission reQuest (ARQ) data block reception apparatus in a communication system, the apparatus comprising:

an ARQ feedback Information Element (IE) generator for generating an ARQ feedback IE including a first field for indicating a Connection IDentifier (CID) of an ARQ connection, a second field for indicating presence/absence of an additional ARQ feedback IE after the ARQ feedback IE, a third field for indicating a type of an Acknowledgement (ACK) MAP included in the ARQ feedback IE, a fourth field for indicating a Block Sequence Number (BSN) of an ARQ data block, and m ACK MAP fields; and a transmitter for transmitting the ARQ feedback IE to an ARQ data block transmission apparatus, wherein the m ACK MAP fields each include information indicating presence/absence of an additional ACK MAP field after a corresponding ACK MAP field, and an ACK MAP indicating success/failure in normal reception for each of n ARQ data blocks, and wherein m and n each denote an integer greater than or equal to 1.

16. The apparatus of claim 15, wherein n ARQ data blocks, the success/failure in normal reception of which is indicated by a first ACK MAP that is an ACK MAP included in a first ACK MAP field among the m ACK MAP fields, include a first ARQ data block that is an ARQ data block mapped to the BSN and (n−1) ARQ data blocks after the first ARQ data block, and an ACK MAP, included in each of (m−1) ACK MAP fields except for the first ACK MAP field among the m ACK MAP fields, includes a second ARQ data block that is an ARQ data block after n ARQ data blocks, success/failure in normal reception of which is indicated by an ACK MAP included in an ACK MAP field before a corresponding ACK MAP field, and (n−1) ARQ data blocks after the second ARQ data block.

17. The apparatus of claim 16, wherein the type of the ACK MAP comprises one of a bitmap type and a sequence MAP type.

18. The apparatus of claim 17, wherein when the ACK MAP type comprises the bitmap type, an ACK MAP included in each of the m ACK MAP fields is generated in the form of a bitmap, and each of m ACK MAPs generated in the form of the bitmap includes the information and a selective ACK MAP field for indicating the ACK MAP.

19. The apparatus of claim 17, wherein when the ACK MAP type comprises the sequence MAP type, an ACK MAP included in each of the m ACK MAP fields is generated in the form of a sequence MAP, and each of m ACK MAPs generated in the form of the sequence MAP includes the information, a sequence format field for indicating a sequence format of the sequence MAP, p sequence length fields, and a sequence ACK MAP field for indicating that a sequence MAP included in each of the p sequence length fields is one of consecutive ACK and consecutive Negative Acknowledgement (NAK), wherein p denotes an integer greater than or equal to 2.

20. The apparatus of claim 19, wherein the sequence format comprises one of a first format indicating that the p sequence length fields comprise 2 sequence length fields, and a second format indicating that the p sequence length fields comprise 3 sequence length fields, and wherein, when the sequence format comprises the first format, the sequence format field is realized with 2 bits, 1 bit of the 2 bits indicates that a sequence MAP included in one sequence length field of the 2 sequence length fields is generated to indicate one of consecutive ACK and consecutive NAK, and the remaining 1 bit of the 2 bits indicates that a sequence MAP included in the remaining sequence length field of the 2 sequence length fields is generated to indicate one of consecutive ACK and consecutive NAK.

21. The apparatus of claim 19, wherein the sequence format comprises one of a first format indicating that the p sequence length fields comprise 2 sequence length fields, and a second format indicating that the p sequence length fields comprise 3 sequence length fields, and wherein, when the sequence format comprises the second format, the sequence format field is realized with 3 bits, 1 bit of the 3 bits indicates that a sequence MAP included in 1 sequence length field of the 3 sequence length fields is generated to indicate one of consecutive ACK and consecutive NAK, 1 bit of the remaining 2 bits indicates that a sequence MAP included in 1 sequence length field of the remaining 2 sequence length fields is generated to indicate one of consecutive ACK and consecutive NAK, and the remaining 1 bit of the 3 bits indicates that a sequence MAP included in the remaining 1 sequence length field of the 3 sequence length fields is generated to indicate one of consecutive ACK and consecutive NAK.

22. The apparatus of claim 15, wherein the ARQ feedback IE transmission apparatus comprises:
an ARQ feedback IE generator for generating the ARQ feedback IE according to the success/failure in normal reception for the ARQ data block transmitted by the ARQ data block transmission apparatus; and
a transmitter for transmitting the generated ARQ feedback IE to the ARQ data block transmission apparatus.

23. An Automatic Retransmission reQuest (ARQ) data block transmission apparatus in a communication system, the apparatus comprising:
a receiver for receiving, from an ARQ data block reception apparatus, an ARQ feedback Information Element (IE) including a first field for indicating a Connection IDentifier (CID) of an ARQ connection, a second field for indicating presence/absence of an additional ARQ feedback IE after the ARQ feedback IE, a third field for indicating a type of an Acknowledgement (ACK) MAP included in the ARQ feedback IE, a fourth field for indicating a Block Sequence Number (BSN) of an ARQ data block, and m ACK MAP fields; and
an ARQ feedback IE analyzer for analyzing the ARQ feedback IE,
wherein the m ACK MAP fields each include information for indicating presence/absence of an additional ACK MAP field after a corresponding ACK MAP field, and an ACK MAP for indicating success/failure in normal reception for each of n ARQ data blocks, and
wherein m and n each denote an integer greater than or equal to 1.

24. The apparatus of claim 23, wherein n ARQ data blocks, success/failure in normal reception of which is indicated by a first ACK MAP that is an ACK MAP included in a first ACK MAP field among the m ACK MAP fields, include a first ARQ data block that is an ARQ data block mapped to the BSN and (n−1) ARQ data blocks after the first ARQ data block, and an ACK MAP, included in each of (m−1) ACK MAP fields except for the first ACK MAP field among the m ACK MAP fields, includes a second ARQ data block that is an ARQ data block after n ARQ data blocks, success/failure in normal reception of which is indicated by an ACK MAP included in an ACK MAP field before a corresponding ACK MAP field, and (n−1) ARQ data blocks after the second ARQ data block.

25. The apparatus of claim 24, wherein the type of the ACK MAP comprises one of a bitmap type and a sequence MAP type.

26. The apparatus of claim 25, wherein when the ACK MAP type comprises the bitmap type, an ACK MAP included in each of the m ACK MAP fields is generated in the form of a bitmap, and each of m ACK MAPs generated in the form of the bitmap includes the information and a selective ACK MAP field for indicating the ACK MAP.

27. The apparatus of claim 25, wherein when the ACK MAP type comprises the sequence MAP type, an ACK MAP included in each of the m ACK MAP fields is generated in the form of a sequence MAP, and each of m ACK MAPs generated in the form of the sequence MAP includes the information, a sequence format field for indicating a sequence format of the sequence MAP, p sequence length fields, and a sequence ACK MAP field for indicating that a sequence MAP included in each of the p sequence length fields is one of consecutive ACK and consecutive Negative Acknowledgement (NAK), wherein p denotes an integer greater than or equal to 2.

28. The apparatus of claim 27, wherein the sequence format comprises one of a first format indicating that the p sequence length fields comprise 2 sequence length fields, and a second format indicating that the p sequence length fields comprise 3 sequence length fields, and wherein, when the sequence format comprises the first format, the sequence format field is realized with 2 bits, 1 bit of the 2 bits indicates that a sequence MAP included in one sequence length field of the 2 sequence length fields is generated to indicate one of consecutive ACK and consecutive NAK, and the remaining 1 bit of the 2 bits indicates that a sequence MAP included in the remaining sequence length field of the 2 sequence length fields is generated to indicate one of consecutive ACK and consecutive NAK.

29. The apparatus of claim 27, wherein the sequence format comprises one of a first format indicating that the p sequence length fields comprise 2 sequence length fields, and a second format indicating that the p sequence length fields comprise 3 sequence length fields, and
wherein, when the sequence format comprises the second format, the sequence format field is realized with 3 bits, 1 bit of the 3 bits indicates that a sequence MAP included in 1 sequence length field of the 3 sequence length fields is generated to indicate one of consecutive ACK and consecutive NAK, 1 bit of the remaining 2 bits indicates that a sequence MAP included in 1 sequence length field of the remaining 2 sequence length fields is generated to indicate one of consecutive ACK and consecutive NAK, and the remaining 1 bit of the 3 bits indicates that a sequence MAP included in the remaining 1 sequence length field of the 3 sequence length fields is generated to indicate one of consecutive ACK and consecutive NAK.

30. The apparatus of claim 23, wherein the ARQ feedback IE reception apparatus comprises:
a transmitter for transmitting an ARQ data block to the ARQ data block reception apparatus; and
an ARQ feedback IE analyzer for analyzing an ARQ feedback IE for the transmitted ARQ data block, received from the ARQ data block reception apparatus.

* * * * *